July 17, 1951  A. C. ZACHLIN  2,560,836

BATTERY PLATE FORMING TANK

Filed Sept. 7, 1946

INVENTOR.

BY ANTHONY C. ZACHLIN

Kwis, Hudson, Boughton & Williams

ATTORNEYS

Patented July 17, 1951

2,560,836

UNITED STATES PATENT OFFICE 2,560,836

BATTERY PLATE FORMING TANK

Anthony C. Zachlin, Cleveland Heights, Ohio, assignor to Willard Storage Battery Company, Cleveland, Ohio, a corporation of West Virginia Application September 7, 1946, Serial No. 695,528

5 Claims. (Cl. 136—34)

The present invention relates to apparatus used in electrolytic processes, especially electrolytic processes employed in the manufacture of secondary or storage batteries of the lead acid type and, more particularly, to the tanks used for "forming" the "green," positive or positive and negative lead acid type battery plates when they are "formed" prior to their assembly into batteries. The term "forming" as used herein and in the storage battery industry refers to the electrolytic process whereby lead or lead oxides comprising the initial battery plate are converted to lead peroxide in the case of positive plates, and spongy lead or lead particles, in the case of negative plates.

One of the principal objects of the invention is the provision of a novel and improved electrolyte container having a submerged positive contact member against which articles to be acted upon by the electric current, such as "green" positive battery plates to be formed are adapted to rest and make contact and which contact member is insulated from the electrolyte by an insulating liquid heavier than the electrolyte and inert thereto.

Another object of the invention is the provision of a novel and improved forming tank having submerged positive and negative contact members located at or adjacent to the bottom of the tank against which "green" positive and negative battery plates, respectively, to be formed are adapted to rest and make contact, thereby eliminating the necessity of burning or otherwise connecting leads or conductor wires thereto.

Figure 1:
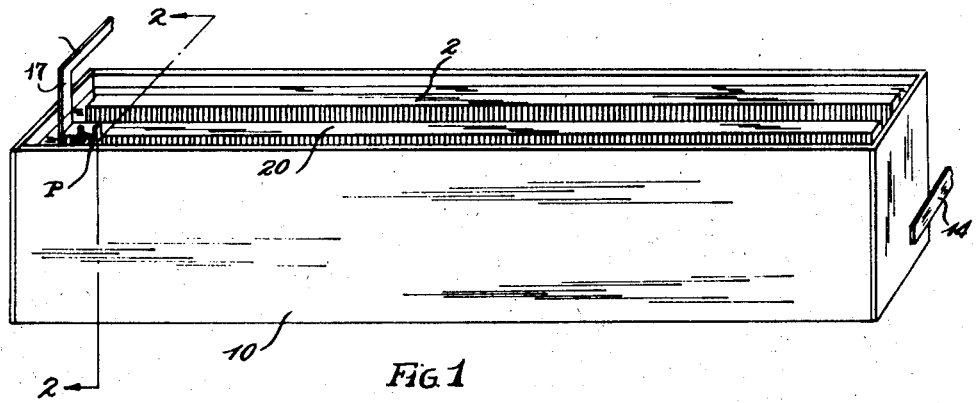
Figure 2:
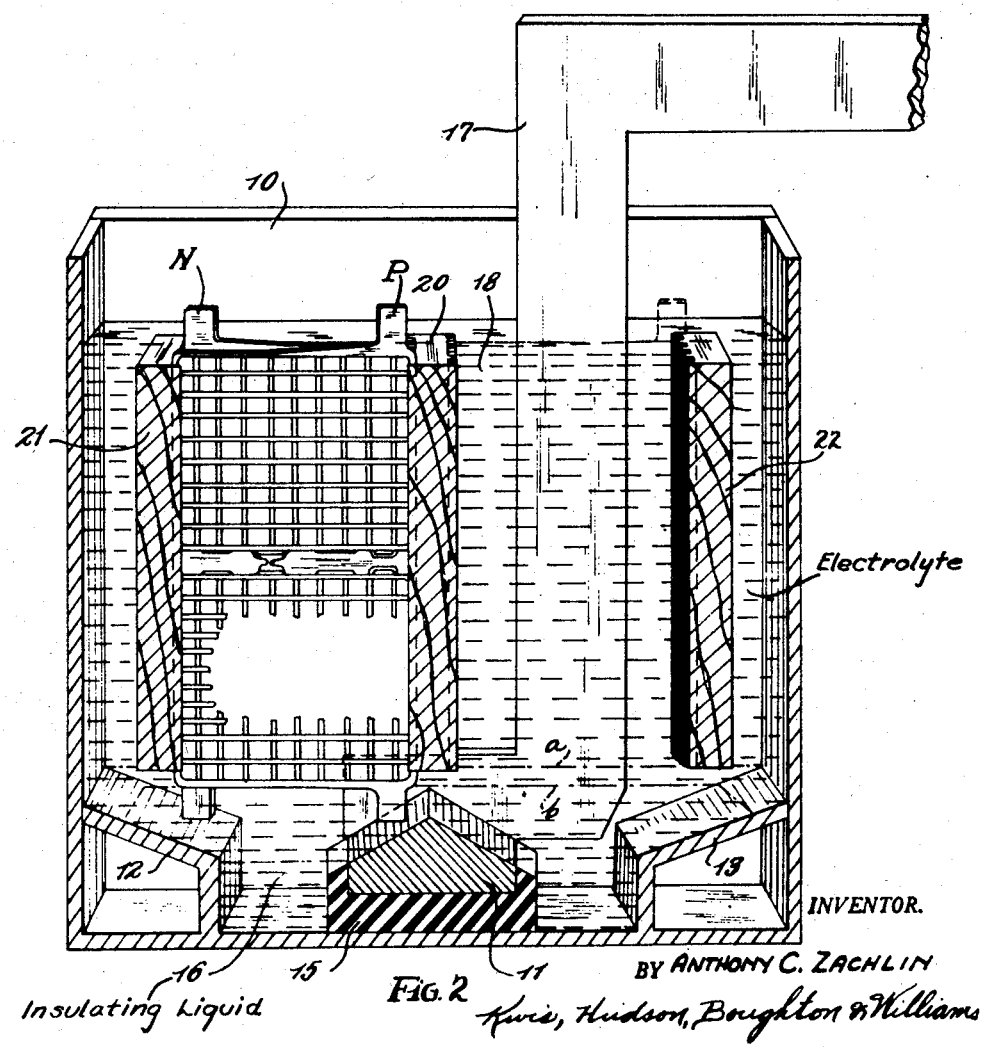

The invention resides in certain constructions and combinations and arrangements of parts and further objects will be apparent to those skilled in the art to which it relates from the following disclosure including a description of the preferred embodiment described with reference to the accompanying drawings forming a part of this specification in which similar reference characters designate corresponding parts throughout the several views, and in which Fig. 1 is a perspective view of a forming tank embodying the present invention; and Fig. 2 is a perspective view approximately on the line 2—2 of Fig. 1.

Briefly described, the present invention comprises a container adapted to hold articles such as "green" positive plates for lead acid type storage or secondary batteries to be formed submerged in a suitable electrolyte while an electric current is passed therethrough and having a positive contact or terminal member submerged in the electrolyte and insulated therefrom by an insulating liquid heavier than and inert to the electrolyte, against which contact member the articles to be acted upon are adapted to rest and make electrical contact.

The invention is particularly adapted to the "tank" process of forming positive plates of lead acid type storage batteries and is herein illustrated and described as embodied in apparatus intended for that purpose. If both positive and negative plates are formed simultaneously in the same tank, as is the case in the embodiment illustrated, the electrical connections to the negative plates are preferably made in a manner similar to that in which the electrical connections are made to the positive plates; however, the negative contact member need not be insulated from the electrolyte because the electro-chemical action at the negative contact tends to produce pure lead, a good conductor of electricity, whereas the electro-chemical action at the positive contact, if exposed to the electrolyte, produces lead peroxide, a poor conductor of electricity. It will be apparent that, when applied to the forming of battery plates, the present invention eliminates the necessity of burning or otherwise connecting leads or conductor wires thereto, thus greatly facilitating and reducing the cost of their manufacture.

Referring to forming plates for lead acid type storage batteries, the container may be of any suitable shape and constructed of any material inert to the forming electrolyte and the battery plates may be held therein in any desired manner. The container shown is an elongated, rectangular tank 10 open at the top and generally square in transverse cross-section. As previously stated, the tank 10 shown is intended to be employed in simultaneously forming both positive and negative, cast-grid, pasted or Faure type twin plates P and N and for economical reasons is adapted to hold two rows of plates. Alternatively the tank may be otherwise constructed or adapted to accommodate any desired number of rows of plates.

The tank 10 is provided with a centrally arranged, submerged positive contact member 11 and two submerged negative contact members 12 and 13 located at opposite sides of the centrally arranged, positive contact member in such a manner that the two rows of plates are served by the one positive contact member. Both the positive and negative contact members extend throughout the length of the tank. The negative contact members 12, 13 are preferably made of a lead antimony alloy as is the tank 10 and are burned to and form a part of the tank which, in turn, is connected to the negative side of the forming electric circuit by a conductor 14, thus making the container itself a part of the negative electrical circuit. A lead antimony alloy is preferred over pure lead as the material for the contact members because of its greater hardness and resistance to nicking.

The positive contact member 11 which is preferably made of a lead antimony alloy is insulated from the tank proper by being positioned in a trough-like member 15 formed of a suitable insulating material, such as, Micarta, Bakelite, etc., resistant or inert to the electrolyte and the insulating liquid 16 hereinafter more specifically referred to. The positive side of the forming circuit is connected to the positive contact member 11 by a suitable conductor 17 also insulated from the tank 10 and preferably having the portion thereof exposed to the electrolyte 18 formed of lead or lead antimony alloy and/or may be coated with some material not affected by the electrolyte, such as a vinyl type of plastic lacquer, to protect it from corrosion in the electrolyte.

The positive contact member 11, or at least the connection of the positive plates therewith, is insulated from the electrolyte 18 so as to maintain a good electrical contact between the contact member and the positive plates throughout the forming process by placing in the bottom of the tank a sufficient quantity of an insulating liquid 16 heavier than and inert to the electrolyte to submerge the contact but not cover any of the portions of the plates which are to be formed. In the embodiment shown, the preferred maximum and minimum levels within which the insulating liquid 16 is maintained is indicated by the dot-dash lines $a$, $b$, respectively; however, it will be understood that the insulating liquid may be maintained at any other suitable level depending upon the construction of the tank, the contact members, and the plates to be formed, etc. Any liquid having the required properties, including being a non-conductor of electricity, inert to and insoluble in and a non-solvent of the electrolyte, and having greater specific gravity than the forming electrolyte, may be used for the insulating liquid 16; for example, chlorinated hydrocarbons, such as, perchlorethylene; ethyl polychlorbenzene, trichlorethylene; 1,2,4-trichlorobenzene; trichlorocumene; o-dichlorobenzene; and trichloromethane; however, the use of trichloromethane and possibly some of the other compounds mentioned may not be economical from a cost standpoint. Other halogenated hydrocarbons, such as, bromides, may be used but are more expensive.

As shown, the negative contact members 12, 13 which extend the entire length of the tank are made of sheet material burned to the tank proper so as to leave hollow portions in opposite lower corners of the tank, thus restricting the space at the bottom of the tank proper and reducing the amount of insulating liquid required to cover the positive contact member. The upper surfaces of the negative contact members 12, 13, which surfaces are adapted to be engaged by a part of the negative plates to be formed, for example, the terminal lugs, are inclined downwardly toward the center of the tank, and the upper surface of the positive contact member 11 is gable-shaped with the opposite sides thereof sloping downwardly toward the adjacent or cooperating negative contact member. The construction is such that any paste, dirt or other material which may fall upon the contact surfaces of the contact member will roll off into the bottom of the tank intermediate the contact members from where it can be readily removed. The sloping surfaces of the contact members permit the plate lugs to touch them only over small areas, thus concentrating the weight of the plates to small areas, thereby producing good electrical contacts between the contact members and plates.

The battery plates are held in vertical position and in predetermined spaced relation by longitudinally extending racks or members 20, 21, 22 located in the center of the tank and along either side thereof, which members are provided with grooves or slots for the reception of the edges of the plates. The racks 20, 21, 22 may be made of wood or any suitable plastic material. Alternatively the plates may be retained in the desired position by any suitable means.

From the foregoing, it will be apparent that a new and improved electrolyte container for electrolytic processes and especially a new and improved forming tank has been provided which eliminates the necessity of burning or otherwise fixedly attaching lead wires or conductors to the battery plates to be formed and which otherwise facilitates and reduces the cost of the operation. Obviously the positive contact arrangement of the present invention can be used with any type of negative contact arrangement other than the submerged negative contact shown; for example, the negative plates may be connected to the forming electrical circuit by burning or otherwise connecting lead wires thereto above the surface of the electrolyte. In like manner, the positive contact may be employed to form positive plates against negative dummies as distinguished from negative plates, if desired. If the positive plates are formed against dummies, the electrical connection to the dummies may be permanent, if desired.

While a preferred construction of forming tank has been shown and described in considerable detail, the invention is not limited to the particular construction shown, as previously suggested, nor is the positive contact arrangement limited to that shown; for example, the insulating liquid may be placed in a separate compartment containing the positive contact member proper as distinguished from being placed in the bottom of the tank proper, as shown. Other changes will suggest themselves to those skilled in the art to which the invention relates and it is my intention to cover hereby all adaptations, modifications and uses of the invention which come within the practice of those skilled in the art and the scope of the appended claims.

Having thus described my invention, I claim:

1. In a tank for forming storage battery plates, the combination of a container adapted to hold battery plates to be formed submerged generally vertically in electrolyte, positive and negative contact members in said container each having a part adapted to be engaged by the battery plates to be formed, and an insulating liquid inert to and having a higher specific gravity than the electrolyte in said container and covering the part of said positive contact member adapted to be engaged by the battery plates.

2. In a tank for forming storage battery plates, the combination of a container adapted to hold battery plates to be formed submerged generally vertically in electrolyte, a negative contact member in the lower part of said container, a positive contact member in the lower part of said container, said contact members having surfaces adapted to be engaged by lower edges of the battery plates to be formed, said surfaces being inclined relative to the plate edges in engagement therewith, and an insulating liquid in said container covering the part of said positive contact member engaged by the battery plates, said insulating liquid being inert to and having a higher specific gravity than the electrolyte employed.

3. In a tank for forming storage battery plates, the combination of a container adapted to hold battery plates submerged in electrolyte, a negative contact member in the lower part of said container, a positive contact member in the lower part of said container, said contact members having inclined surfaces facing one another adapted to be engaged by the battery plates to be formed, and an insulating liquid in the bottom of said container covering the part of said positive contact member engaged by the battery plate, said insulating liquid being inert to and having a higher specific gravity than the electrolyte employed.

4. In a tank for forming storage battery plates, the combination of a container adapted to hold battery plates submerged in electrolyte, a negative contact member in the lower part of said container, a positive contact member in the lower part of said container, said contact members having inclined surfaces facing one another adapted to be engaged by the battery plates to be formed, and an insulating liquid composed essentially of a chlorinated hydrocarbon and in the bottom of said container covering the part of said positive contact member engaged by the battery plate, said insulating liquid being inert to and having a higher specific gravity than the electrolyte employed.

5. In a tank for forming storage battery plates, the combination of a rectangularly shaped container adapted to hold battery plates submerged in electrolyte, spaced negative contact members located in and restricting the lower part of said container, a positive contact member in the lower part of said container, a positive contact member in the lower part of said container located intermediate said negative contact members, said contact members having inclined surfaces facing one another adapted to be engaged by the battery plates to be formed, and an insulating liquid in the bottom of said container covering the part of said positive contact member engaged by the battery plate, said insulating liquid being inert to and having a higher specific gravity than the electrolyte employed.

ANTHONY C. ZACHLIN.

REFERENCES CITED

The following references are of record in the file of this patent:

UNITED STATES PATENTS

| Number | Name | Date |
|---|---|---|
| 1,175,280 | Luthy | Mar. 14, 1916 |
| 1,378,461 | Hubbell | May 17, 1921 |
| 1,456,420 | Blackburn | May 22, 1923 |
| 1,903,448 | Furtney | Apr. 11, 1933 |
| 2,139,947 | Ford et al. | Dec. 13, 1938 |

FOREIGN PATENTS

| Number | Country | Date |
|---|---|---|
| 211,714 | Great Britain | Feb. 28, 1924 |

OTHER REFERENCES

Pirani et al., Zeitschrift fur Metallkunde, vol. 16 (1924), page 132.